INVENTORS
CLYDE J. WELCKER
ROLAND L. WELCKER
BY
ATTORNEYS

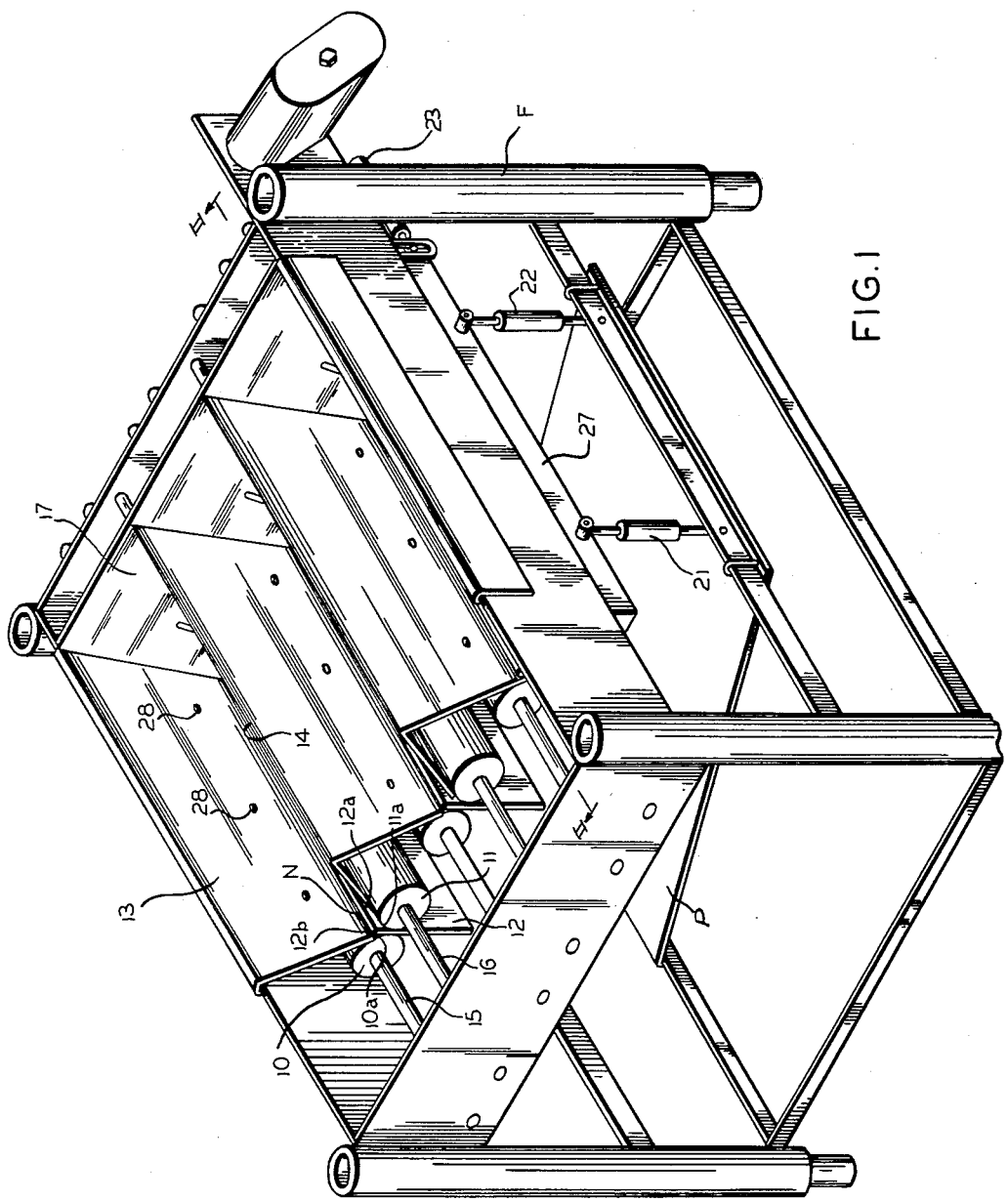

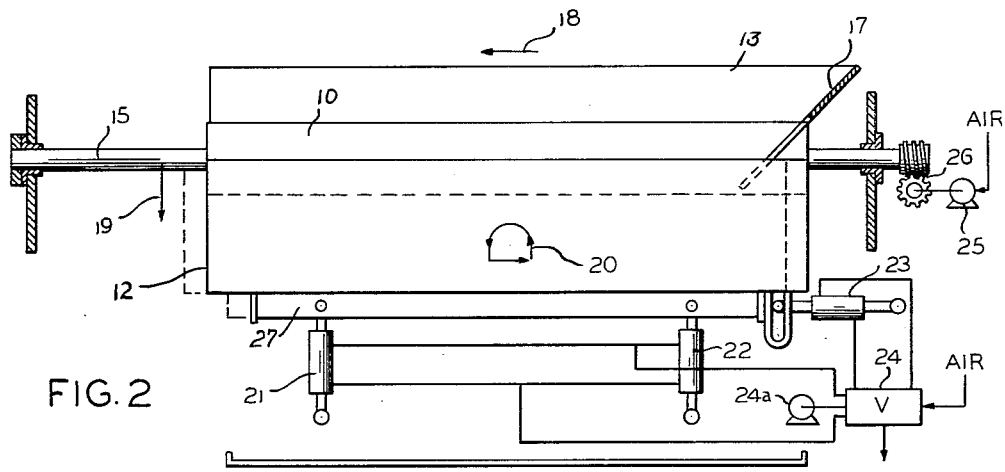
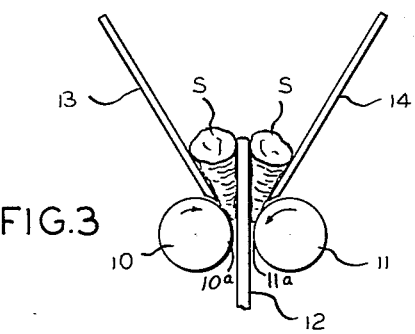
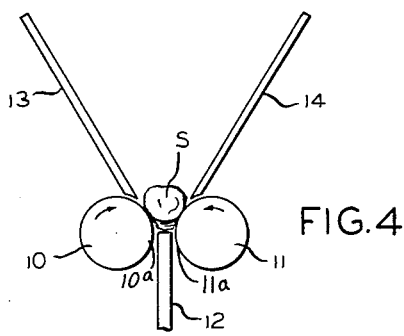
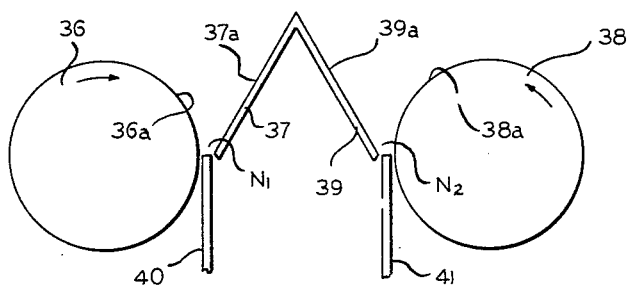

Aug. 11, 1964  C. J. WELCKER ETAL  3,143,761
APPARATUS FOR PROCESSING SHRIMP AND THE LIKE
Filed July 9, 1962  5 Sheets-Sheet 5

INVENTORS
CLYDE J. WELCKER
ROLAND L. WELCKER
BY
ATTORNEYS

United States Patent Office 3,143,761
Patented Aug. 11, 1964

3,143,761
APPARATUS FOR PROCESSING SHRIMP
AND THE LIKE
Clyde J. Welcker and Roland L. Welcker, New Orleans, La., assignors to Welcker Corporation, a corporation of Louisiana
Filed July 9, 1962, Ser. No. 208,242
16 Claims. (Cl. 17—2)

The present invention relates to improvements in machines for processing shrimp by removing their outer shells and separating the meat from the inedible shells and other inedible or objectionable portions of the shrimp.

More particularly the present invention contemplates the provision of a shrimp cleaning machine with a pair of side members such as rolls, or plates having planar surfaces, generally defining an elongated nip therebetween with a center plate having vertical side surfaces facing inwardly and downwardly inclined sloping surfaces of the side members, with means connected to the center plate for moving it vertically relative to the side members in the nip defined therebetween for frictionally removing shells from the shrimp. The rolls are preferably rotated inwardly toward the plate and the plate is provided with a unique undulating or tilted D-shaped motion in a vertical plane wherein the plate moves up and down in an arcuate path and returns horizontally to its starting point. The horizontal movement is employed for moving the shrimp along the rollers horizontally.

The present invention is a continuation-in-part of our copending application U.S. Serial No. 87,425, filed February 6, 1961, now Patent No. 3,080,605.

A general object of the invention is to provide a shrimp cleaning machine of the above type having improved features and refinements for cleaning shrimp and for control of the shrimp cleaning process for a more complete and thorough shrimp cleaning operation without damage to the meats of the shrimp.

A further object of the invention is to provide an improved shrimp cleaning mechanism of the above type wherein a grading of the shrimp is possible and wherein shrimp are discharged in progressive sizes.

A further object of the invention is to provide an improved shrimp cleaning machine of the above type employing both rollers and plates in opposed nip defining relationship wherein planar surfaces of plates are positioned above smaller rollers.

A further object of the invention is to provide a shrimp cleaning machine of the above type wherein the movement of the shrimp and action thereon caused by frictional contact between the surfaces and the shrimp are controlled with the application of water.

A further object of the invention is to provide an improved shrimp cleaning machine wherein possible damage to the tails of the shrimp is eliminated by the spacing of the elements of the machine.

A still further object of the invention is to provide an improved drive arrangement for a shrimp cleaning machine.

Other objects, advantages and features will become more apparent with the teaching of the principles of the invention in connection with the disclosure of the preferred embodiments thereof in the specification, claims and drawings in which:

FIGURE 1 is a perspective view shown in somewhat schematic form of a shrimp cleaning machine embodying the principles of the present invention;

FIGURE 2 is a fragmentary sectional view, shown partially in schematic form and taken substantially along line II—II of FIGURE 1;

FIGURE 3 is a schematic end elevational view of a shrimp cleaning mechanism embodying the principles of the present invention, and showing a center plate in raised position;

FIGURE 4 is an end elevational view of the mechanism of FIGURE 3, showing the center plate in lowered position;

FIGURE 5 is an end elevational view of a modified arrangement of the shrimp cleaning mechanism;

*As Shown on the Drawings*

Figure 6:
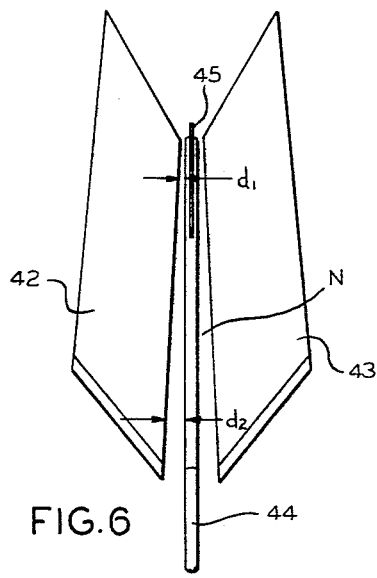
FIGURE 6 is a perspective view showing a further form of shrimp cleaning mechanism.

As illustrated in FIGURES 1 and 2, the mechanism generally includes a pair of side members which are shown in the form of a pair of parallel substantially horizontally extending rollers 10 and 11 defining a nip N therebetween. Positioned in the nip is a vertical plate 12 which has unique vertically reciprocatory movement in a closed D-shaped cycle. The rollers 10 and 11 provide downwardly inclined surfaces 10a and 11a which slope toward the nip N, and in some constructions these surfaces may be provided by planar surfaces as described and shown in our copending application Serial No. 87,425 (now U.S. Patent No. 3,080,605, included herein by reference).

The center plate 12 has upwardly extending substantially vertical side surfaces 12a and 12b which face the sloping surfaces of the rollers 10 and 11. The rollers are rotated so that the downwardly sloping surfaces 10a and 11a move inwardly toward the nip, and the center plate is driven in its closed cycle to move vertically relative to the rollers to frictionally engage the shrimp in the nip and remove the shells from the shrimp meat. Below the rollers is a stationary inclined trash plate P, coextensive with the nips but ending at the ends of the rollers so that shrimp falling off the end of the rollers fall past the end of the plate.

Positioned above the rollers 10 and 11 are stationary plates 13 and 14 which also provide downwardly inclined sloping surfaces which slope toward the nip, and the operation and function of these plates will be further described in connection with FIGURES 3 and 4. The plates extend sufficiently high on each side so that they act as guide surfaces to channel shrimp dumped into the machine toward the nip.

The rollers 10 and 11 are rotatably supported on shafts 15 and 16 which are elongated at the discharge end of the machine as illustrated in FIGURES 1 and 2 so that the shrimp can drop downwardly off the ends of the rolls. It may be desirable to position another tier of processing elements beneath the tier illustrated so that the shrimp will again pass through the machine moving along other sets of rollers in an opposite horizontal direction (substantially as shown in our U.S. Patent No. 3,080,605). As illustrated in FIGURE 2 the shrimp are dumped into the machine at a receiving end against a plate 17 and move along the rollers 10 and 11 toward the discharge end in the direction indicated by the arrowed line 18. The shrimp, after they have traversed along the length of the rollers 10 and 11, drop downwardly at the end as indicated by the arrowed line 19.

The rollers are supported on a frame F of the machine and their shafts are supported in suitable bearings at their ends. The plates 13 and 14 are similarly suitably supported on the frame F which may be of conventional design embodying upright legs with laterally extending rigid frame members. The plates 12 are secured to a movable bed 27 which is connected to power driven operators for imparting movement to the plates 12 as will be described. The machine has a plurality of cleaning nips as will be observed from FIGURE 1, and each of the nips is of the same construction embodying the same elements and therefore only one need be described in detail.

The bed 27 is provided with vertical movement by expansible chambers in the form of cylinders with pistons therein driven by compressed air. The cylinders 21 and 22 provide vertical movement to the bed 27, and horizontal movement is afforded by a cylinder 23, FIGURE 2. The combined actions of the cylinders 21, 22 and 23 provides the D shaped movement in the path indicated by the tilted "D" 20, FIGURE 2. This movement moves the plate 12 in a vertical upward and downward arcuate movement, and in a return horizontal movement. The upward and downward arcuate movement provide the frictional engagement with the shrimp for cleaning it, and also cause the shrimp to move laterally along the rollers. The return movement returns the plate 12 to its original starting position so that the shrimp are given movement along the rollers.

To obtain this movement the cylinders are provided with compressed air in the proper sequence as controlled by a control valve 24. This valve is operated by a suitable valve operator 24a. The valve 24, for example, may be a rotary valve with suitable passages therethrough and with a core driven by a motor 24a to supply and vent air to the ends of the cylinders 21, 22 and 23 in the proper sequence as will be appreciated by those versed in the art. The compressed air provides a resilient drive for the plates providing an improved yielding resilient action for operating on the shrimp.

The compressed air is also conveniently used to drive an air motor 25 connected to reduction gearing 26 for rotating the rollers.

Figure 18:
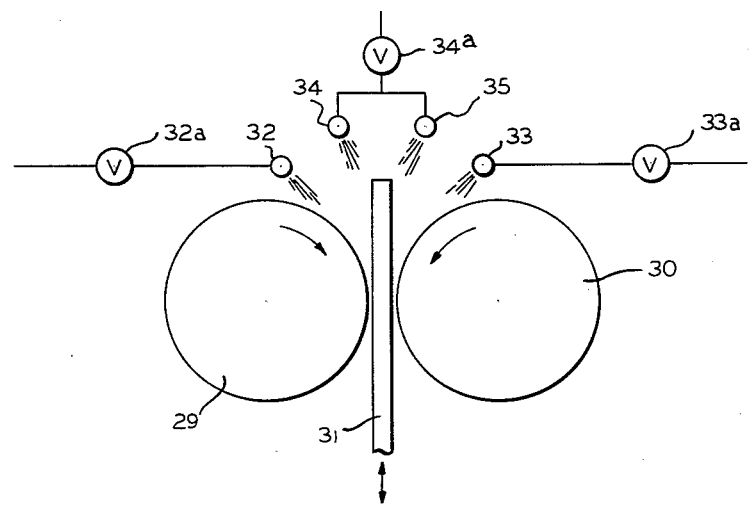
FIGURE 18 is a schematic end elevational view illustrating the application of water to the elements to control friction.

Water is supplied to the shrimp in the cleaning nip by suitable means such as indicated schematically by openings 28, although in a preferred arrangement a controlled and selective flow of water will be supplied to the rolls and plate as is illustrated in FIGURE 18.

In FIGURE 18 rolls 29 and 30 form a nip therebetween with a vertical plate 31 positioned in the nip between the rolls and mounted for vertical reciprocatory action. Water is supplied to the downwardly sloping surface of the roll 29 through a water supply jet 32, and water is similarly supplied to the downwardly sloping surface of the roll 30 by a jet 33. The quantity of water supplied to these surfaces is regulated by flow control valves 32a and 33a. Water is supplied to the side surfaces of the plate 31 through jets 34 and 35 and the quantity is regulated by a valve 34a. By control of the flow of water against the surfaces the friction between the surfaces and the shrimp can be regulated. The frictional force is also regulated by the speed of the elements and this can be controlled by regulating the speed of drive for the rolls, and the speed of operation of the control valve 24, FIGURE 2.

FIGURES 3 and 4 illustrate the positions and operation on shrimp bodies S in the raised and in the lowered position of the plate 12. It will be noted from the view of FIGURE 4 showing the plate 12 in lowered position that the top edge of the plate 12 is always at least as high as the nip, thereby functioning as a closure for the bottom of the nip when in such lowered position. The present construction takes into consideration the geometry of the body of the shrimp and prevents mutilation and loss of shrimp meat. In the operation of the machine it is desirable to have the friction forces developed to a point to force the shell material through the apex between the rolls 10 and 11, but it is not desirable to have the friction force developed to such a value to force the meats into deforming into the apex or throat sufficiently that they become flattened and are forced through so as to be mutilated and lost. In the nip or throat slippage must occur with the body meats to prevent mutilation and loss of meat.

The shrimp near the head end has a cross section of round oval with dimensions much greater than the tail end. Toward the tail end the oval becomes less round and approaches long ellipse, and at the very end of the tail, it may in most instances become flat and pointed. The geometry of the elements and their action on the shrimp body will be described in connection with FIGURES 7 through 17.

In some environments it may be desired to employ other arrangements, such as illustrated in FIGURE 5.

As illustrated in FIGURE 5, nips $N_1$ and $N_2$ for cleaning shrimp employ a roller on one side and a fixed planar member on the other side. For the nip $N_1$ a roller 36 provides a curving first downwardly sloping surface 36a, and a plate 37 provides a second opposed downwardly sloping planar surface 37a. For the nip $N_2$, a roller 38 has a downwardly sloping surface 38a and a plate 39 provides a downwardly sloping planar surface 39a. A vertically moving plate 40 moves up and down in the nip $N_1$, and a plate 41 moves up and down in the nip $N_2$, each moving in the tilted D movement. The rollers may be driven in rotation to move their surfaces toward the nips.

In the arrangement of FIGURE 6, a pair of side plates 42 and 43 form a nip N therebetween with a plate 44 in the nip. The plates are positioned so that their lower edges are separated by an increasing space, and at the head end of the nip a space $d_1$ exists between the side of the plate 44 and the edge of the side member 42, and at the discharge end a space $d_2$ exists between the side of the plate 44 and the lower edge of the side member 42. This space will permit the cleaned shrimp to fall down therethrough and shrimp of increasing size will fall through the space as the space becomes wider. This can be used as a means for grading the shrimp. It will be of course understood that the mechanism of FIGURE 6 is positioned at the end of the machine after the cleaning has been substantially completed. The space $d_2$ is of course larger than $d_1$ so that the grading according to size will occur.

Further, the center plate 44 may employ a vertical cutting blade 45 which projects slightly above the top edge of the plate 44 to slit the outer surface of the shrimp to expose the vein which then becomes an appendage that is removed and separated from the body meat. The center plate 44 of course has the oscillating slanted "D" cycle of movement to frictionally clean the shrimp and move the shrimp laterally along through the nip N.

Figure 7:
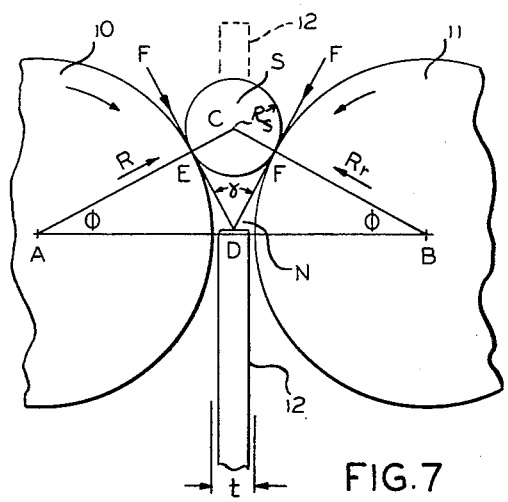
FIGURES 7 through 17 are schematic illustrations or are plotted graph showings of features of the invention illustrated for the purpose of disclosing and describing the invention.
Figure 8:
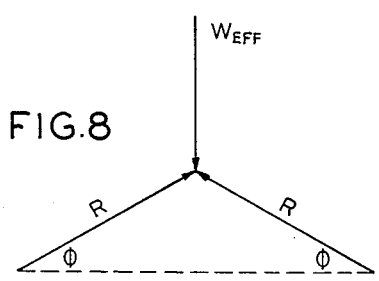

FIGURE 7 shows a schematic diagram with the shrimp body S in the nip between the rolls 10 and 11 when the center plate 12 is lowered. FIGURE 8 shows the force diagram of forces on the shrimp body due to its weight and the reaction force of the shrimp on the roller surfaces, which forces control the frictional force F. The angles and forces may be analyzed as follows:

$$\angle CFD = \angle CED = 90°$$

DE and DF are tangents $$\phi = \angle ABC = \angle CAB$$

△ABC is isosceles $$\angle EDC = \angle CDF$$

DC bisects ∠EDF $$\angle EDF = \gamma$$

$$\angle DCB = \angle DCA = 90 - \phi$$

transversal to parallel lines $$\gamma = 36° - 180 - 2(90 - \phi)$$

total degrees in quadrilateral equals 360°

$$\gamma = 2\phi$$

Figure 9:
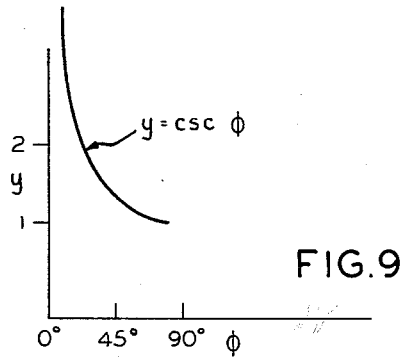
Figure 10:
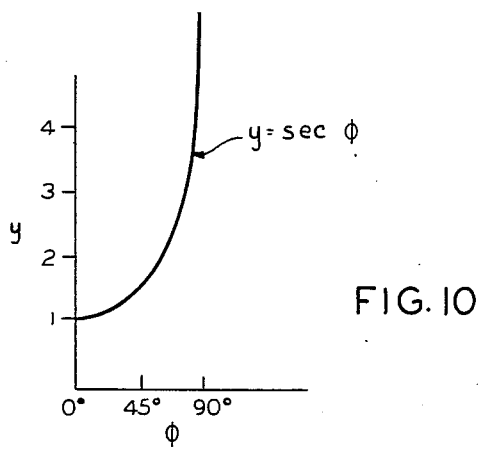

$\gamma$ is twice the size of $\phi$
$F$=friction force
$R$=roller reaction force
$K_f$=coefficient of friction
$W_{eff}$=effective weight
$F = K_f R$ $$F = K_f \left(\frac{W_{eff}}{2}\right)(\csc \phi)$$

friction forces varies as a function of the csc $\phi$;
friction is minimum when $\phi$ is 90° and approaches ∞ 0°, as illustrated in FIGURE 9.
From an inspection of FIGURE 7:

$$\cos \phi = \frac{R_r + t/2}{R_r + R_s}$$

$$\sec \phi = \frac{R_r + R_s}{R_r - t/2}$$

$\phi$ varies as a secant function involving roller radius, shrimp radius at point in question and halft the distance (space) between rollers. (See FIGURE 10.)
Considering the possible postions of the shrimp with relation to the rollers, for $\phi$ to be 90°, if the shrimp is still in contact with both rollers, the diameter has to be infinitely large. Such is not the possibility considering the usual size of shrimp. There is the slight possibility that the rollers are very small and the shrimp are gargantuan. In this case the relatively flat side of the shrimp would contact the top of both rollers. Friction is a minimum when $\phi$ is 90.

If $R_s$ is equal to $t/2$, sec. $\phi = 1$ giving a $\phi$ value of 0°. Since F varies as a csc this means that friction would approach a very large value. This is true if shrimp deform into the very bottom and R is still an appreciable value. However, lubrication, surface conditions and velocities are so chosen to insure slippage before such deformation occurs.

We then have to consider the smaller diameter portions of the body near the tail end. These enter the apex without deformation and before slippage occurs. The $R_s$ slightly greater $t/2$ will deform to build up roller reaction (R) and have an appreciable F value. Slippage must occur if mutilation is to be avoided.

Slippage is assured for in this body region. Deformation that fills the apex finds that the center plate is a bar to passage and the friction will build up and exceed the capacity of the surfaces.

The very tail end with dimensions less than $t$ can not fill the apex and be in contact with surfaces, and these delicte sections are not subject to severe deformation, abrasion and mutilation.

The presence of "$t$," or in other words an apex or throat space, establishes a limit to the smallest size diameter that will be subjected to frionction. The tail section can be saved from being overworked during that portion of the cycle when the center plate is down and returning to the starting position.

An inspection of the relationships established, immediately shows that with proper selection of $R_r$ and $t$, the best cleaning action without mutilation to shrimp body meat can be obtained.

For very large shrimp, large size rollers are best. Conversely, for small size shrimp, small size rollers are best.

The friction values can be further controlled by also changing direction of rotation of the roller or rollers. The preceding method of analysis can be used to analyze any combination of roller rotations. "$t$" still serves as a means of limiting action on shrimp body with a dimension less than "$t$" and still serves as a block at the very bottom of the apex.

The condition when center plate is up and proceeding in a downward motion, roller turning inward, shrimp body in contact with plate and one roller, is as follows, with reference to FIGURES 11 and 12:

$$\angle DFC = 90°$$

DF is tangent $$\angle COB = 90°$$

by construction $$\angle ADF = \angle OBA = \phi = \gamma$$

congruent triangles $$\cos \phi = \frac{R_p}{R_r}, \quad R_p = R_r \cos \phi$$

$$\sin \phi = \frac{W}{R_r}, \quad R_r = \frac{W_{eff}}{\sin \phi}$$

$$\frac{W}{R_p} = \tan \phi, \quad \frac{W}{R_r} = \sin \phi$$

Figure 13:
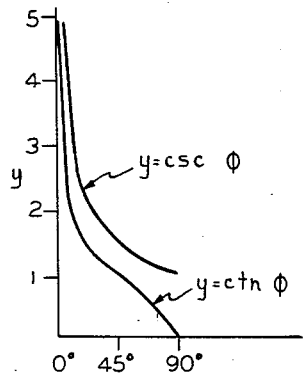
Figure 14:
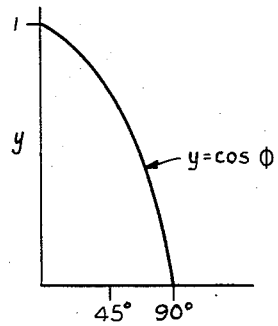

$R_r = W \csc \phi$
$R_p = W \ctn \phi$
$F_p$=friction of plate
$F_r$=friction of roller
$K$=coefficient of friction
$F_r = K_p W \csc \phi$
$F_p = K_r W \ctn \phi$ The values are plotted on FIGURES 13 and 14.
If "K," the coefficient of friction is the same for both surfaces, it will be noted from inspection that $F_r$ is always larger than $F_p$ for varying values of $\phi$.

By proper selection of surface materials and velocities of surfaces to each other, $K_p$ and $K_r$ can be varied. They can be made to equal each other in which case $F_r > F_p$ or the coefficient of friction can be controlled such that $F_r$ equals $F_p$.

$$\cos \phi = \frac{R_r - R_s}{R_r + R_s}$$

As plotted on FIGURE 14 the shrimp body can be made to rotate. The friction force from the roller is usually larger than the friction capability of the plate surface and slippage occurs on the plate surface. The shrimp slip on the plate while fully developing the frictional capability of the plate and rotationally engages the roller.

It should also be noted that $\phi$ is a cosine function involving $R_r$ and $R_s$.

The very tail end of the shrimp can be wedged into the apex and be exposed to severe friction action. The tail section is subject to cleaning during only 180° of cycle of center plate, and, too, only the maximum severity for 90° when plate is coming down. In the rising portion of first 90° of cycle, the friction values are much smaller.

Figure 11:
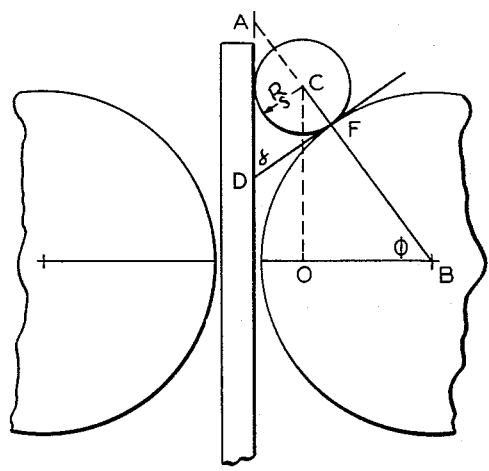
Figure 12:
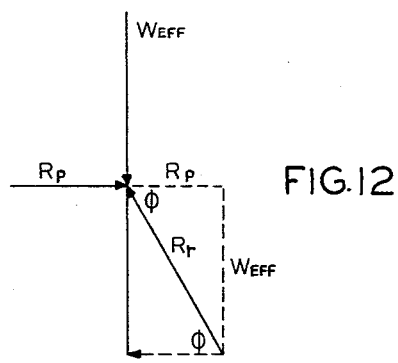

As shown in FIGURES 7 and 11, the angle between the friction forces is half the value in the up position than when the plate is down.

Figure 15:
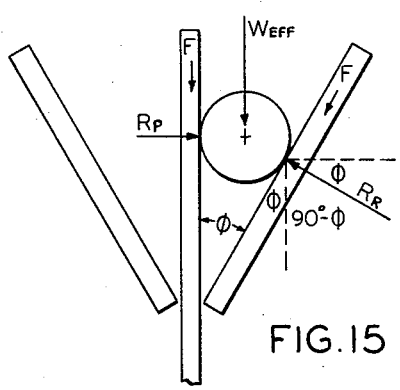
Figure 16:
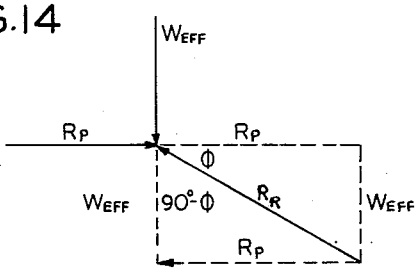

The condition where side members are stationary flat surfaces and with the moving center plate in up position may be analyzed with reference to FIGURES 15 and 16:

$$\frac{R_p}{W} = \tan^{90-\phi}$$

$$R_p = W \tan^{90-\phi}$$

$$R_p = W \cot \phi$$

$$\frac{W}{R_r} = \sin \phi$$

$$R_r = \frac{W}{\sin \phi} = W \csc \phi$$

Figure 17:
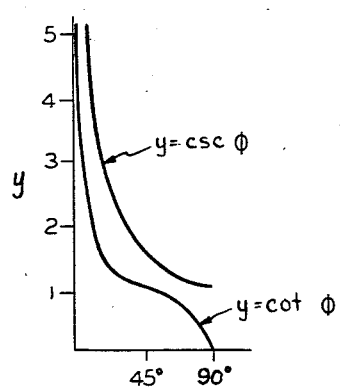

$\phi$ is a constant by means of construction
No matter what portion of shrimp or how far down into apex it is located,
$\phi$ is constant
$F_p = K_p W \cot \phi$
$F_r = K_p W \csc \phi$
See FIGURE 17.

By varying $\phi$ by setting side members at different angles $\phi$ can be selective. Approaching 0°, friction increases and approaches infinity with mashing and mutilation of shrimp.
Approaching 90° the friction force approaches a minimum.

It is not merely by the function of the process and machine to remove the shell material from the meat, but also to be selective in the amount of friction applied to the various portion of the body meats once they have been cleaned. Abrasion and unwanted mutilation of the surface of the body meat which contain the distinctive network of color in the shrimp body is limited to preserve this surface material. It immediately follows that a higher efficiency or conservation of cleaned meats will be effected.

It has been previously shown that the presence of the center plate in the down position with moving side members is in itself a control limiting friction on certain portions of the shrimp body.

With moving side members, in the first 90° center plate travel (going up) the center plate establishes new conditions. The direction of friction changes, its magnitude changes, but most of all the value of the angle between friction vectors is half the value as when the plate is down and the two moving side members are coacting on the shrimp body.

In the second 90° of cycle, when center plate is moving from its highest elevation to the lowest, the friction direction changes again, increases in magnitude and has an angle between friction vectors of half the value as when the plate is down and the two side members are coacting on the shrimp body.

The importance in choice of radius of curvature of side members and its relation to the cross section dimension of the shrimp has been illustrated. It has also been shown that when the center plate coacts with stationary plane side members, the angle between friction vectors is constant regardless of how far down in the apex or what size the shrimp cross section is. The importance of slippage of cleaned shrimp body and prevention of excessive friction to cause mutilation has been emphasized.

The possible construction and selection of variables as already shown, allows the construction of a machine that is far superior in operation than those heretofore available. The machine can be designed to clean any size shrimp and not merely be economical on the small to medium sizes.

The center plate is a means of transporting the shrimp and is also a friction applicator in the up cycle and a friction limitor in the down position can function between two side arrangements, each a combination of roller and and fixed plate.

Much smaller rollers can be used in constant rotation and a fixed stationary shield tangent to the rollers and at an angle to the center plate would constitute the remainder, forming the apex, as illustrated in FIGURES 3 and 4, by the plates 13 and 14.

The large portion of the shrimp can be cleaned and contacted with the flat surfaces of the plates 13 and 14 when center plate is up. The smaller tail end would go down into the apex of the center plate and curved moving rollers 10 and 11 when the center plate 12 is down.

When the center plate is down, the shrimp body would be in contact with both rollers, 10 and 11 but now their sizes are smaller in diameter (smaller than necessary if only rollers and not side plates are used) to satisfy the amount of friction that is desired to be developed.

The larger diameter of shrimp would ride high on the two small rollers 11 and 12. The medium portion of the shrimp would be further down into the curvature as shown in FIGURE 3. The very delicate tail is once again protected from excess friction by presence of center plate 12.

Figure 19:
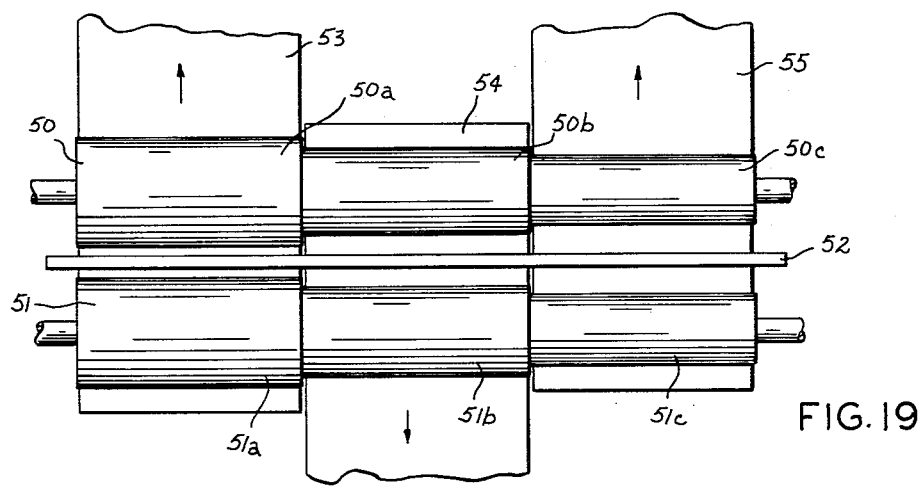
FIGURES 19 and 20 are schematic top plan views showing arrangements for grading shrimp.
Figure 20:
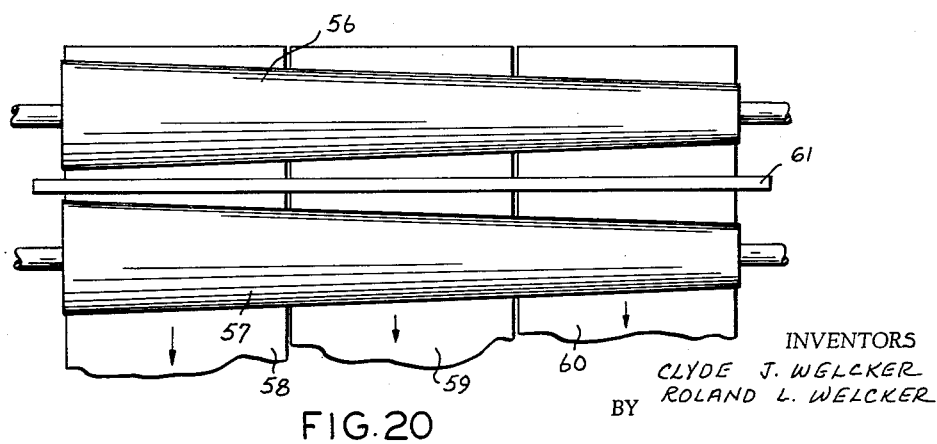

FIGURES 19 and 20 illustrate additional arrangements which permit the grading of shrimp being processed.

In FIGURE 19 a pair of rolls 50 and 51 are positioned to define a nip therebetween for processing shrimp. A center plate 52 is positioned in the nip in the same arrangement as discussed with previous embodiments. The rolls 50 and 51 have different sections reduced in diameter along their length so as to increase the size of the nip. The rolls have a first portion 50a and 51a of largest diameter to define the smallest nip therebetween, and only the smallest shrimp will fall through the nip in the space between the surface of the rollers and the center plate 52. The rollers have a next section of reduced size, 50b and 51b, forming a larger nip for shrimp of increased size to fall therethrough. The rolls have end sections 50c and 51c of still smaller diameter to provide the largest size nip for dropping a still larger size of shrimp. Conveyors 53, 54 and 55 are positioned below the successive sized nips for conveying away the shrimp meats, and the conveyors are illustrated as operating in different directions.

In the arrangement of FIGURE 20, rollers 56 and 57 are shown as being tapered or cone shaped with a plate 61 therebetween. As the shrimp move along the rollers they will begin to fall through the nip between the rollers and plate 61 with the smaller shrimp first falling through and then successively larger shrimp. Separate conveyors 58, 59 and 60 are provided which may lead to different containers for conveying away the different size shrimp.

Thus it will be seen that we have provided improvements in a shrimp cleaning machine of the type described, which meets the objectives, advantages and features of the invention as hereinabove set forth. The mechanism and process embodied perform a superior shrimp cleaning operation with improved efficiency in removal of shells, waste and trash, and a reduced multilation and reduced loss of meat is encountered.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. A machine for processing shrimp comprising in combination a pair of side members generally defining an elongated nip therebetween, at least one of which side members having an inwardly and outwardly inclined surface sloping towards said nip, a center plate having at least one generally vertical side surface facing and coextensive with the aforesaid sloping surface, said plate and said surface being separated by a first space at one location along the nip and by a second wider space at a different location so that shrimp which will not pass between the center plate and said surface at the first location will pass therebetween at the second location, and means effecting relative motion between said side members and said plate to advance shrimp through the first location and to the second location.

2. A machine for processing shrimp comprising a first friction member having an upwardly extending surface, a second friction member having a downwardly sloping surface in nip defining relationship with said first friction member, said members diverging along their length to form a nip of increasing width so that shrimp of increasing size will pass between said members at progressive locations along the length, one of said members having an elongated surface area coextensive with said nip facing the other of said members and said area being movable in a closed cycle upwardly and downwardly relative to the nip with the entire length of said surface area having substantially uniform movement, and means operatively associated with said members for effecting such cyclic relative motion.

3. A machine as claimed in claim 1 wherein at least one of said side members has an inwardly and downwardly inclined surface formed by a roller.

4. A machine as claimed in claim 3 having means associated with said roller for rotating the inwardly and downwardly inclined surface thereof toward said nip.

5. A machine for cleaning shrimp comprising in combination first and second side members, and a third side member above said second side member to face said first member with said second and third members defining a nip with said first member, said second and third members each having inwardly and downwardly inclined shrimp cleaning surfaces sloping towards said nip, said first member having an elongated upwardly extending surface area parallel to said nip and being movable in a closed cycle upwardly and downwardly relative to said nip with the entire length of said area having substantially uniform movement.

6. A machine for cleaning shrimp comprising in combination first and second side members, and a third side member above said second side member to face said first member with said second and third members defining a nip with said first member, said second member being a roller and said third member having a planar surface, said second and third members each having inwardly and downwardly inclined shrimp cleaning surfaces sloping towards said nip, said first member having an elongated upwardly extending surface area parallel to said nip and being movable in a closed cycle upwardly and downwardly relative to said nip with the entire length of said area having substantially uniform movement.

7. A machine for cleaning shrimp comprising in combination a pair of side roller members generally defining an elongated nip therebetween, a center plate having vertical side surfaces facing the rollers, a pair of side members having planar surfaces above said rollers forming a continuation of said elongated nip, and means operatively associated with said center plate for moving the center plate vertically relative to the side members in the nip defined therebetween for frictionally removing shells from shrimp with the planar surfaces engaging shrimp bodies of larger diameter and the roll members engaging shrimp bodies of smaller diameter.

8. A machine for processing shrimp comprising a first friction member having an upwardly extending surface, a second friction member having a downwardly sloping surface in nip defining relationship with said first friction member, one of said members having an elongated surface area parallel to said nip facing the other of said members and said area being movable in a closed cycle upwardly and downwardly relative to the nip with the entire length of said surface area having substantially uniform movement relative to said nip, and a gas pressure operated resilient driving means for effecting relative movement between said members whereby said elongated surface area may carry out movement in said closed cycle.

9. A machine for processing shrimp comprising a first friction member having an upwardly extending surface, a second friction member having a downwardly sloping surface in nip defining relationship with said first friction member, one of said members having an elongated surface area parallel to said nip facing the other of said members and said area being movable in a closed cycle upwardly and downwardly relative to the nip with the entire length of said surface area having substantially uniform movement relative to said nip, and an air pressure operated expansible chamber operator connected to drive said one member so that a resilient driving force will be applied.

10. A machine for cleaning shrimp comprising in combination a pair of side members generally defining an elongated nip therebetween, at least one of which side members having an inwardly and downwardly inclined surface sloping toward said nip, a center plate having at least one generally vertical side surface facing the aforesaid sloping surface, means operatively associated with said center plate for moving the center plate vertically relative to the side member in the nip defined therebetween for frictionally removing shells from shrimp between said sloping surface and said generally vertical side surface by frictional engagement of the shrimp at said nip, and separate means for selectively applying a given quantity of water to different locations on said surfaces.

11. A machine for processing shrimp comprising a first friction member having an upwardly extending surface, a second friction member having a downwardly sloping surface in nip defining relationship with said first friction member, one of said members having an elongated surface area parallel to said nip facing the other of said members and said area being movable in a closed cycle upwardly and downwardly relative to the nip with the entire length of said surface area having substantially uniform movement relative to said nip, means for effecting relative movement between said members whereby said elongated surface area may carry out movement in said closed cycle, and separate means for selectively applying a given quantity of water to different locations on said surfaces for controlling the friction between the shrimp and the surface of said member.

12. A machine for cleaning shrimp comprising in combination a pair of side members generally defining an elongated nip therebetween, said side members having inwardly and downwardly inclined surfaces sloping toward said nip, a center plate having generally vertical side surfaces facing said sloping surfaces, said side members spaced apart at the lower edges of said sloping surfaces a distance substantially at least as great as the diameter of the tails of shrimp to be processed by said machine, said center plate having a top edge at all times remaining at a level substantially at least as high as the nip, and means operatively associated with said center plate for moving the center plate vertically relative to the side members in a nip defined therebetween for frictionally removing shells from shrimp between said sloping surfaces and the generally vertical side surfaces by frictional engagement of the shrimp at said nip.

13. A machine for processing shrimp comprising a first friction member having an upwardly extending surface, a second friction member having a downwardly sloping surface in nip defining relationship with said first friction member, one of said members having an elongated surface area parallel to said nip facing the other of said members with said area being movable in a closed cycle upwardly and downwardly relative to the nip with the entire length of said surface area having a substantially uniform movement relative to said nip, means for effecting relative movement between said members whereby said elongated surface area may carry out movement in said closed cycle, and separate means for selectively applying a given quantity of water to different locations on said surfaces for controlling the friction between the surfaces of said members and shrimp being processed.

14. A machine for processing shrimp comprising a first friction member having an upwardly extending surface, a second friction member having a downwardly sloping surface in nip defining relationship with said first friction member, one of said members having an elongated surface area parallel to said nip facing the other of said members with said area being movable in a closed cycle upwardly and downwardly relative to the nip with the entire length of said surface area having a substantially uniform movement relative to said nip, means for effecting relative movement between said members whereby said elongated surface area may carry out movement in said closed cycle, a water supply means for one of said members, and separate means for selectively applying a given quantity of water to different locations on said surfaces to selectively control the friction between the members supplied with water and the shrimp.

15. A machine for cleaning shrimp comprising in combination a pair of side members generally defining an open-topped elongated nip therebetween, said side members having inwardly and downwardly inclined surfaces sloping toward said nip, said nip having a feed end for receiving shrimp at one end thereof for movement of the shrimp in the nip away from the feed end, a center plate having side surfaces between said sloping surfaces, said side members being spaced apart at the nip a distance substantially at least as great as the diameter of the tails of shrimp to be processed by said machine, said center plate having a top edge at all times remaining at a level substantially at least as high as the nip, and said center plate top edge at the feed end of the nip being of substantial width to form a closure for the bottom of the nip at such feed end when the plate is in its lowermost position, and means operatively associated with the center plate and side members for effecting relative cyclic motion between said center plate side surfaces and said inclined surfaces of said side members.

16. A machine for cleaning shrimp comprising, in combination, a pair of rollers generally defining an open-topped elongated nip therebetween, said rollers presenting inwardly and downwardly directed surfaces sloping toward said nip, a center plate in a plane generally tangential to said rollers having side surfaces facing said sloping surfaces of the rollers, said nip between the rollers having a feed end for receiving shrimp at one end thereof and for movement of the shrimp in the nip away from the feed end, said rollers being spaced apart along the nip defining surfaces thereof a distance substantially at least as great as the diameters of the tails of shrimp to be processed by said machine, said center plate having a top edge at all times remaining at a level substantially at least as high as the nip and said center plate at the feed end of the nip having a top edge of substantial width to form a closure for the bottom of the nip when the plate is in its lowermost position at such feed end, and means operatively associated with said center plate for moving the center plate in the plane of the common tangent for the two rollers in the nip defined therebetween for frictionally removing shells from shrimp between said sloping surfaces of the rollers and the side surfaces of the plate by frictional engagement of the shrimp at the nip.

References Cited in the file of this patent
UNITED STATES PATENTS

| | | |
|---|---|---|
| 2,546,414 | Abbott | Mar. 27, 1951 |
| 3,080,605 | Welcker et al. | Mar. 12, 1963 |

FOREIGN PATENTS

| | | |
|---|---|---|
| 157,400 | Australia | July 5, 1954 |